United States Patent [19]

Lam

[11] Patent Number: 5,121,295
[45] Date of Patent: Jun. 9, 1992

[54] COMPUTER INTERFACE CARD MOUNTING DEVICE

[75] Inventor: Tai-Seng Lam, Taipei, Taiwan

[73] Assignee: Flytech Technology Company, Ltd., Taipei, Taiwan

[21] Appl. No.: 654,732

[22] Filed: Feb. 13, 1991

[51] Int. Cl.$^5$ .............................................. H05K 1/14
[52] U.S. Cl. ..................... 361/395; 361/393; 361/399; 361/415; 361/420; 364/708; 360/137
[58] Field of Search ............... 361/391, 392, 393, 394, 361/395, 399, 417, 419, 420, 415; 364/708; 360/97.01, 99.02, 99.06, 137

[56] References Cited

U.S. PATENT DOCUMENTS

| | | | |
|---|---|---|---|
| 4,758,928 | 7/1988 | Wierec et al. | 361/415 |
| 4,924,355 | 5/1990 | Mitchell et al. | 361/415 |
| 4,979,075 | 12/1990 | Murphy | 361/399 |

Primary Examiner—Leo P. Picard
Assistant Examiner—Young S. Whang
Attorney, Agent, or Firm—Woodcock Washburn Kurtz Mackiewicz & Norris

[57] ABSTRACT

A computer interface card mounting device is incorporated in a computer casing of a notebook computer. The computer casing has a first side wall, a second side wall opposite to the first side wall, and a diskette receiving opening formed on the first side wall. The mounting device has an elongated loop flange extending inward from the second side wall, directly opposite to the diskette receiving opening, and having one side with a threaded opening. The computer interface card has a mounting panel, one end of which is to be mounted on the flange at the threaded opening. The second side wall has a longitudinally extending elongated opening surrounded by the flange for accessing electrical connectors provided on the mounting panel.

3 Claims, 2 Drawing Sheets

COMPUTER INTERFACE CARD MOUNTING DEVICE

BACKGROUND OF THE INVENTION

1. Field of the Invention

The invention relates to a mounting device, more particularly to a mounting device for horizontally mounting an interface card in a notebook computer.

2. Description of the Related Art

Notebook computers are known in the art. These computers have basically the same functions as those of conventional personal computers. Notebook computers are, however, more compact and thus occupy less space.

Conventional personal computers are provided with expansion slots to receive computer interface cards to achieve memory expansion and other supplementary function. The computer interface cards usually comprise a circuit board and a mounting panel which may be integrated with or detachably mounted on the circuit board. The mounting panel is then fastened on the computer casing by means of screws.

Presently, notebook computers are not provided with expansion slots similar to those of conventional personal computers because of the thinness of the notebook computer. Thus, standard computer interface cards cannot be directly mounted inside the notebook computer without modifying the construction of the computer interface cards. Memory expansion, interfacing with other computer peripherals, and addition of circuit components to permit performance of supplementary functions cannot be achieved with the use of a conventional notebook computer.

SUMMARY OF THE INVENTION

Therefore, the objective of the present invention is to provide a mounting device for mounting a computer interface card on a notebook computer to permit memory expansion, interfacing with other computer peripherals, and the like, the computer interface card being similar to those used in conventional personal computers.

More specifically, the objective of the present invention is to provide a mounting device for horizontally mounting a computer interface card in a notebook computer.

Accordingly, the preferred embodiment of a computer interface card mounting device of the present invention is to be incorporated in a computer casing of a notebook computer. The computer casing has a first side wall, a second side wall opposite to the first side wall, and a diskette receiving opening formed on the first side wall. The mounting device comprises an elongated loop flange extending inward from the second side wall, directly opposite to the diskette receiving opening, and having one side with a threaded opening. The computer interface card has a mounting panel, one end of which is to be mounted on the flange at the threaded opening. The second side wall has a longitudinally extending elongated opening surrounded by the flange to serve as a means for accessing electrical connectors provided on the mounting panel. The mounting device further includes a clamping piece disposed adjacent to the flange and distal from the threaded opening. The clamping piece has an inward bend portion cooperatively associated with the flange to confine a notch therebetween. The other end of the mounting panel is to extend into the notch and is to be pushed inward by the bend portion.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
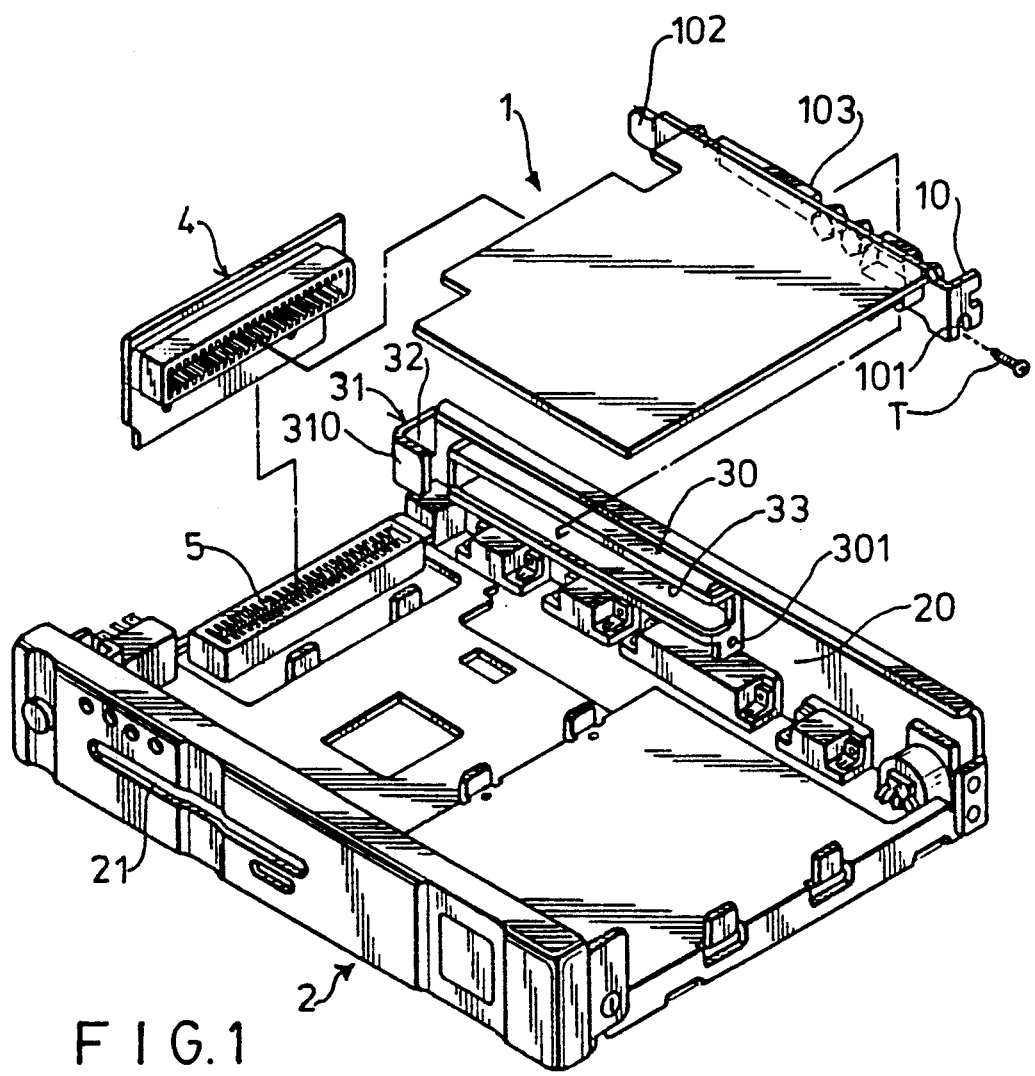
FIG. 1 is an exploded view of a notebook computer incorporating the preferred embodiment of a computer interface card mounting device according to the present invention.
Figure 2:
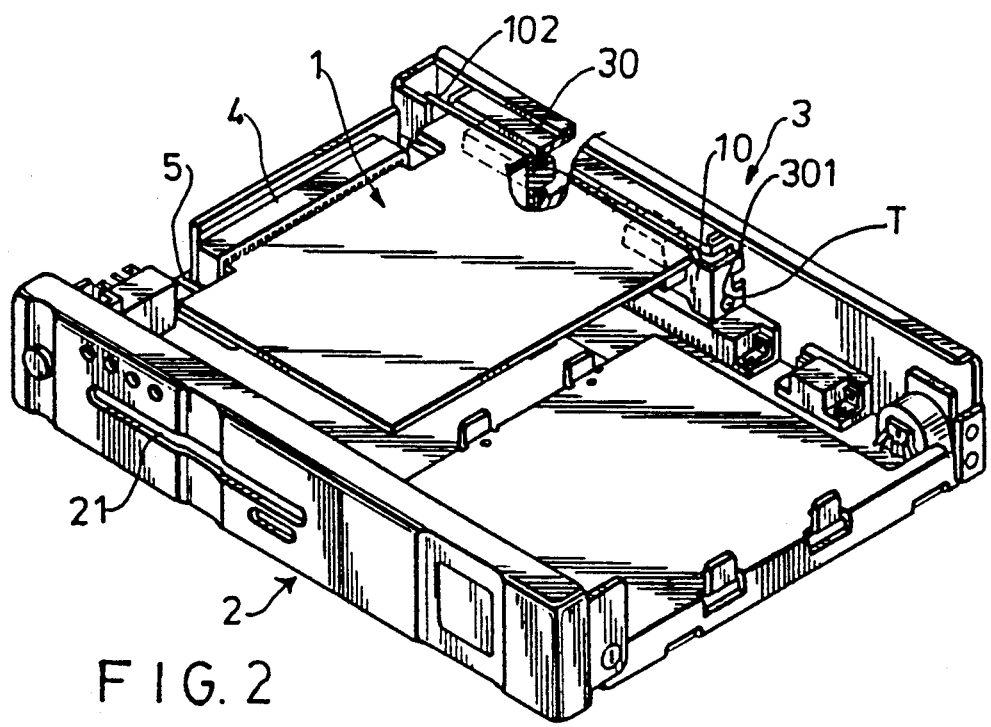
FIG. 2 is a perspective view of the notebook computer incorporating the preferred embodiment.
Figure 3:
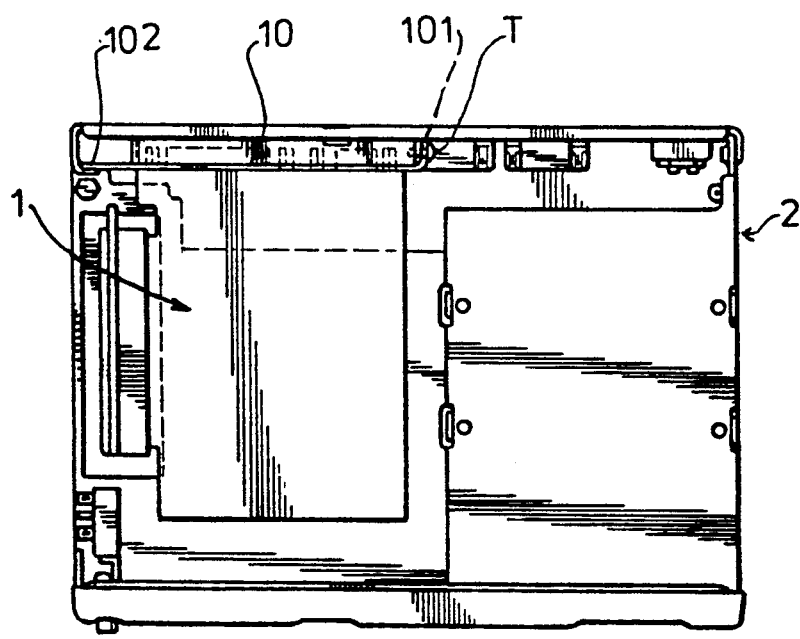
FIG. 3 is a top view of the notebook computer incorporating the preferred embodiment.

Referring to FIGS. 1, 2 and 3, a mounting device 3 is provided to mount a computer interface card 1 on the computer casing 20 of a notebook computer 2. The computer casing 20 has a longitudinally extending elongated opening (not shown) provided directly opposite to a diskette receiving opening 21 thereof. The mounting device 3 includes an elongated loop flange 30 extending inward from the computer casing 20 and surrounding the elongated opening. One side of the loop flange 30 is provided with a threaded opening 301 to mount the computer interface card 1 on the loop flange 30. A clamping piece 31 is disposed adjacent to the side of the loop flange 30 distal from the threaded opening 301. The clamping piece 31 is substantially L-shaped and has an inward bend portion 310 extending in the direction of the loop flange 30. The bend portion 310 and the loop flange 30 confine a notch 32 therebetween.

A vertically disposed printed circuit board to printed circuit board (PCB to PCB) electrical connector 4 electrically connects the computer interface card 1 with a horizontally disposed PCB electrical connector 5 which is electrically connected to the central processing circuitry (not shown) of the notebook computer 2. One end 102 of a mounting panel 10 of the computer interface card 1 extends into the notch 32. The other end of the mounting panel 10 has a mounting hole 101 to be aligned with the threaded opening 301. Electrical connectors 103 provided on the mounting panel 10 are disposed in a receiving space 33 confined by the loop frame 30 and are accessed via the elongated opening of the computer casing 20. A screw T is provided to mount the mounting panel 10 on the loop frame 30 via the mounting hole 101 and the threaded opening 301. When the mounting panel 10 is mounted on the loop frame 30, the bend portion 310 pushes the end 102 of the mounting panel 10 inward to tightly clamp the mounting panel 10 between the bend portion 310 and the loop frame 30.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

What is claimed:

1. A mounting device for horizontally mounting a computer interface card in a notebook computer which has a computer casing, said computer casing having a first side wall, a second side wall opposite said first side wall and a diskette receiving opening formed on said first side wall, said computer interface card having a mounting panel, said mounting device comprising:

a flange extending inward from said second side wall and having one side with a threaded opening, said mounting panel having one end to be mounted on said flange at said threaded opening, said flange being an elongated loop flange and being positioned directly opposite said diskette receiving opening, wherein said second side wall has a longitudinally extending elongated opening surrounded by said flange to serve as a means for accessing electrical connectors provided on said mounting panel, and a clamping piece disposed adjacent to said flange and distal from said threaded opening, said clamping piece having an inward bend portion cooperatively associated with said flange to confine a notch therebetween, the other end of said mounting panel to extend into said notch and to be pushed inward by said bend portion.

2. A notebook computer adapted for horizontal mounting of a computer interface card therein, said computer having a casing with a first side wall with a diskette receiving opening whereby a diskette can be inserted into said computer, said interface card having a mounting panel formed on one edge thereof, comprising:

said casing having an elongated opening in a second side wall, said elongated open being positioned substantially opposite said diskette receiving opening;

said panel having a clamping end at a first end and an attaching end at its opposite end, a loop flange extending inward from said second side wall and substantially around the perimeter of said elongated opening, said flange having a receiving opening at one end and a clamping means at its opposite end for clamping said clamping end of said panel, and said interface card being mounted to said flange to lie between said first and second side walls, said attaching end and receiving opening being joined by an attaching element, and said clamping means clamping said panel clamping end, whereby said interface card is maintained in a fixed predetermined position.

3. The computer as described in claim 2, comprising connector means for electrically connecting said interface card with.

* * * * *

UNITED STATES PATENT AND TRADEMARK OFFICE
CERTIFICATE OF CORRECTION

PATENT NO. : 5,121,295

DATED : June 9, 1992

INVENTOR(S) : Tai-Seng Lam

It is certified that error appears in the above-identified patent and that said Letters Patent is hereby corrected as shown below:

Claim 3, col. 4, line 26, after "with" add --said central processing circuitry--.

Signed and Sealed this

Ninth Day of November, 1993

Attest:

BRUCE LEHMAN

*Attesting Officer*  *Commissioner of Patents and Trademarks*